United States Patent
Kim

(10) Patent No.: US 10,017,204 B2
(45) Date of Patent: Jul. 10, 2018

(54) ELECTRIC POWER STEERING APPARATUS

(71) Applicant: MANDO CORPORATION, Pyeongtaek-si, Gyeonggi-do (KR)

(72) Inventor: Hyoung Woo Kim, Seoul (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 108 days.

(21) Appl. No.: 15/295,807

(22) Filed: Oct. 17, 2016

(65) Prior Publication Data
US 2017/0120947 A1    May 4, 2017

(30) Foreign Application Priority Data
Oct. 29, 2015   (KR) .................. 10-2015-0150989

(51) Int. Cl.
*B62D 5/04*     (2006.01)
*F16H 7/16*     (2006.01)

(52) U.S. Cl.
CPC ......... *B62D 5/0424* (2013.01); *B62D 5/0403* (2013.01); *B62D 5/0463* (2013.01); *F16H 7/16* (2013.01)

(58) Field of Classification Search
CPC ........ B62D 5/0409; B62D 5/0412; F16H 7/16
See application file for complete search history.

(56) References Cited

U.S. PATENT DOCUMENTS

| | | | |
|---|---|---|---|
| 9,188,202 B2* | 11/2015 | Markley | F16H 7/08 |
| 2004/0043854 A1* | 3/2004 | Fraley, Jr. | B62D 5/0424 |
| | | | 474/134 |
| 2005/0121251 A1* | 6/2005 | Ueno | B62D 5/0409 |
| | | | 180/444 |
| 2007/0095600 A1* | 5/2007 | Jo | B62D 5/0424 |
| | | | 180/444 |
| 2016/0273624 A1* | 9/2016 | Suzuki | F16H 7/1281 |
| 2017/0307060 A1* | 10/2017 | Klein | F16H 7/1281 |
| 2018/0017143 A1* | 1/2018 | Antchak | F16H 7/1218 |

* cited by examiner

*Primary Examiner* — Kevin Hurley
(74) *Attorney, Agent, or Firm* — McDermott Will & Emery LLP

(57) ABSTRACT

The present invention relates to an electric power steering apparatus. The electric power steering apparatus includes: a rack housing including a sliding recess that is formed between a motor coupling hole in which a motor pulley is mounted and a ball nut coupling hole in which a nut pulley is mounted, the sliding recess being formed to extend in a direction perpendicular to a longitudinal direction where a belt is mounted; and a tension adjusting member including a central shaft one end of which is inserted into the sliding recess, a connection member coupled to another end of the central shaft, a pair of rollers coupled to opposite ends of the connection member to tighten opposite sides of an outer peripheral face of the belt, the central shaft being slid along the sliding recess to adjust the tension of the belt.

8 Claims, 14 Drawing Sheets

US 10,017,204 B2

ELECTRIC POWER STEERING APPARATUS

CROSS REFERENCE TO RELATED APPLICATION

This application claims priority from Korean Patent Application No. 10-2015-0150989, filed on Oct. 29, 2015, which is hereby incorporated by reference for all purposes as if fully set forth herein.

BACKGROUND OF THE INVENTION

1. Field of the Invention

The present invention relates to an electric power steering apparatus. More particularly, the present invention relates to an electric power steering apparatus in which, when a driver abruptly operates the steering wheel, when the driver causes the steering wheel to collide with left and right lock ends at a rapid speed, or when strong impact is transmitted, which is reversely input from a road surface, the tension of a belt is increased to prevent the occurrence of a tooth jump phenomenon that causes teeth formed on the motor pulley, the nut pulley, and the belt to be jumped, and in which a tension adjusting member is slid without the operation of a motor or an operator to increase the engagement areas between the motor pulley and the nut pulley and the belt, and as a result, the noise and vibration, and the damage of the belt, which are caused as the teeth of the belt move over the teeth of the motor pulley, are prevented, and the path length of the belt is increased to increase the tension thereof.

2. Description of the Prior Art

FIG. 1 is a view illustrating a configuration of a conventional electric power steering apparatus according to the prior art. FIG. 2 is a side view illustrating a motor pulley housing and a rack housing according to the prior art.

As illustrated in FIG. 1, the conventional electric power steering apparatus includes a steering system 100 that is continued from a steering wheel 101 to opposite vehicle wheels 108, and an auxiliary power mechanism 120 configured to provide a steering assist power to the steering system 100.

The steering system 100 includes a steering shaft 102 that is connected, at one side, to the steering wheel 101 to be rotated with the steering wheel 101, and connected, at the other side, to a pinion shaft 104 via a pair of universal joints 103. In addition, the pinion shaft 104 is connected to a rack bar 109 through a rack and pinion mechanism 105, and the opposite ends of the rack bar 109 is connected to vehicle wheels 108 through tie rods 106 and knuckle arms 107.

The rack and pinion mechanism 105 is formed by a pinion gear 111 formed on a pinion shaft 104 and a rack gear 112 formed on one side of the outer peripheral surface of the rack bar 109, in which the pinion gear 111 and the rack bar 109 are engaged with each other. Thus, when a driver operates the steering wheel 101, a torque is generated in the steering system 100, and the vehicle wheels 108 are steered by the generated torque via the rack and pinion mechanism 105 and the tie rods 106.

The auxiliary power mechanism 120 includes: a torque sensor 121 configured to sense a torque that is applied to the steering wheel 101 by the driver and to output an electric signal that is proportional to the sensed torque; an Electronic Control Unit (ECU) 123 configured to generate a control signal based on the electric signal sent from the torque sensor 121; a motor 130 configured to generate an auxiliary power based on the control signal sent from the electronic control unit 123; and a belt-type transmission 140 configured to transmit the auxiliary power generated from the motor 130 to the rack bar 109 via a belt.

Accordingly, the electric power steering apparatus is configured such that a torque generated by the rotation of the steering wheel 101 is transmitted to the rack bar 109 via the rack and pinion mechanism 105, and the auxiliary power generated by the motor 130 according to the generated torque is transmitted to the rack bar 109 by the belt-type transmission 140 via a ball screw unit 150. That is, the torque generated by the steering system 100 and the auxiliary power generated by the motor 130 are combined with each other so as to cause the rack bar 109 to move in an axial direction.

In addition, as illustrated in FIG. 2, the motor 130 is fixed by coupling a gear housing 235 enclosing the motor 130 and a rack housing 207 by bolts 209. At the time of steering, when a motor shaft 203 is rotated to drive a belt 143, thereby rotating a ball nut 205 area, a force acts in a direction of pulling the motor shaft 203 and the shaft of the rack bar 109 that is provided with the ball nut 205 to each other by the tension of the belt 143.

The force generated as described above is concentrated to the bolts 209 coupling areas between the gear housing 235 and the rack housing 207 that are the mechanically weakest portions, and due to the bolt 209 releasing phenomenon by the vibration and impact generated while the motor shaft 203 is rotated at the time of steering, the motor shaft 203 is moved toward the rack bar 109 that is provided with the ball nut 205, thereby reducing the tension of the belt 143 such that the teeth of the belt 143 move over the teeth of the driving pulley 210. Thus, noise is generated and the belt 143 is damaged such that the steering assist power is not correctly transmitted.

The conventional electric power steering apparatus described above has a problem in that, when a driver abruptly operates the steering wheel, when the driver causes the steering wheel to collide with left and right lock ends at a rapid speed, or when a strong impact is transmitted, which is reversely input from a surface road, a tooth jump phenomenon that causes teeth formed on the motor pulley, the nut pulley, and the belt to be jumped is generated such that the steering assist power cannot be correctly transmitted.

In addition, the conventional electric power steering apparatus also has a problem in that, when the tension of the belt is reduced due to the aged endurance, the belt, the motor pulley, and the nut pulley are not stably engaged with each other and the engagement area is reduced such that the teeth of the belt move over the teeth of the driving pulley. Thus, noise and vibration are generated, and the belt is damaged.

In addition, when the tooth jump phenomenon is generated in a state where steering is abruptly performed in an emergency situation during the operation of a vehicle, a fatal problem may be caused in the driving stability of the vehicle.

SUMMARY OF THE INVENTION

An object of the present invention is to provide an electric power steering apparatus in which, when a driver abruptly operates the steering wheel, when the driver causes the steering wheel to collide with left and right lock ends at a rapid speed, or when strong impact is transmitted, which is reversely input from a road surface, the tension of a belt is increased to prevent the occurrence of a tooth jump phenomenon that causes teeth formed on the motor pulley, the nut pulley, and the belt to be jumped, thereby improving the driving stability of the vehicle, and providing a comfortable steering feeling to the driver by preventing the occurrence of vibration and noise.

In addition, an object of the present invention is to provide an electric power steering apparatus in which a tension adjusting member is slid without the operation of a motor or an operator to increase the engagement areas between the motor pulley and the nut pulley and the belt, and as a result, the noise and vibration, and the damage of the belt, which are caused as the teeth of the belt move over the teeth of the motor pulley, can be prevented, and the path length of the belt can be increased to increase the tension thereof.

The object of the present invention is not disclosed to those described above, and other objects, which are not described above, may be clearly understood by a person ordinarily skilled in the art from the following description.

According to the present invention, there may be provided an electric power steering apparatus. The electric power steering apparatus includes: a rack housing including a sliding recess that is formed between a motor coupling hole in which a motor pulley is mounted and a ball-nut coupling hole in which a nut pulley is mounted, the sliding recess being formed to extend in a direction perpendicular to a longitudinal direction where a belt is mounted; and a tension adjusting member including a central shaft one end of which is inserted into the sliding recess, a connection member coupled to another end of the central shaft, a pair of rollers coupled to opposite ends of the connection member to tighten opposite sides of an outer peripheral face of the belt, the central shaft being slid along the sliding recess to adjust the tension of the belt.

According to an aspect of the present invention, when a driver abruptly operates the steering wheel, when the driver causes the steering wheel to collide with left and right lock ends at a rapid speed, or when strong impact is transmitted, which is reversely input from a road surface the tension of a belt is increased to prevent the occurrence of a tooth jump phenomenon that causes teeth formed on the motor pulley, the nut pulley, and the belt to be jumped, thereby improving the driving stability of the vehicle, and at the same time, providing a comfortable steering feeling to the driver by preventing the occurrence of vibration and noise.

In addition, the tension adjusting member is slid without the operation of a motor or an operator to increase the engagement areas between the motor pulley and the nut pulley and the belt. Thus, the noise and vibration, and the damage of the belt, which are caused as the teeth of the belt move over the teeth of the motor pulley, can be prevented, and the path length of the belt can be increased to increase the tension thereof.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
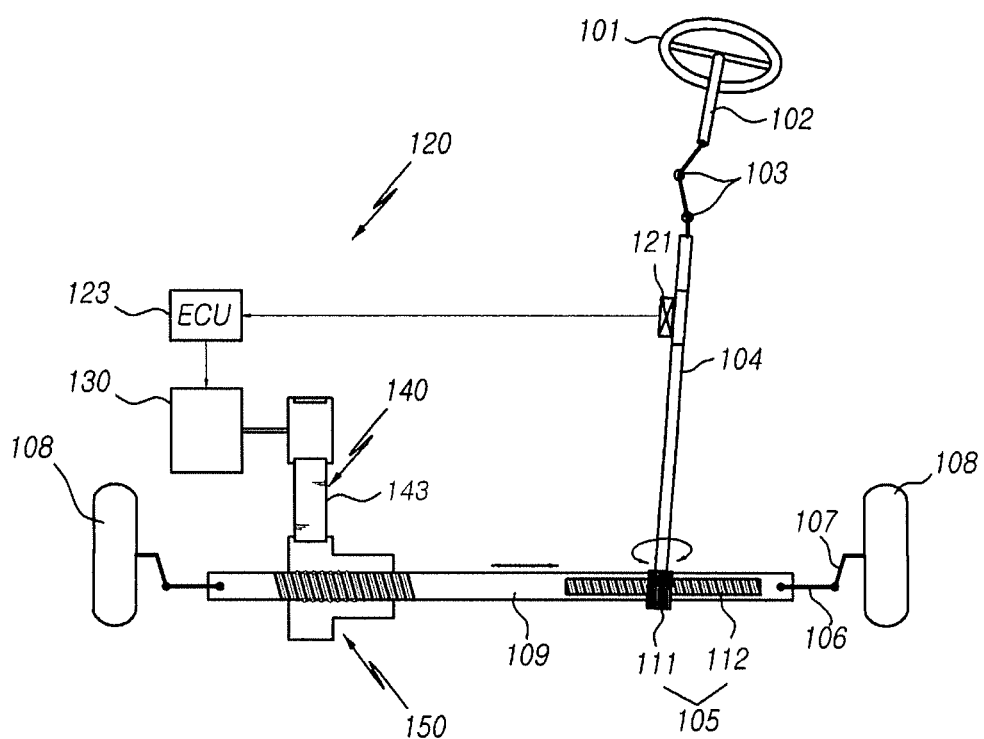
FIG. 1 is a view illustrating a configuration of a conventional electric power steering apparatus according to the prior art.
Figure 2:
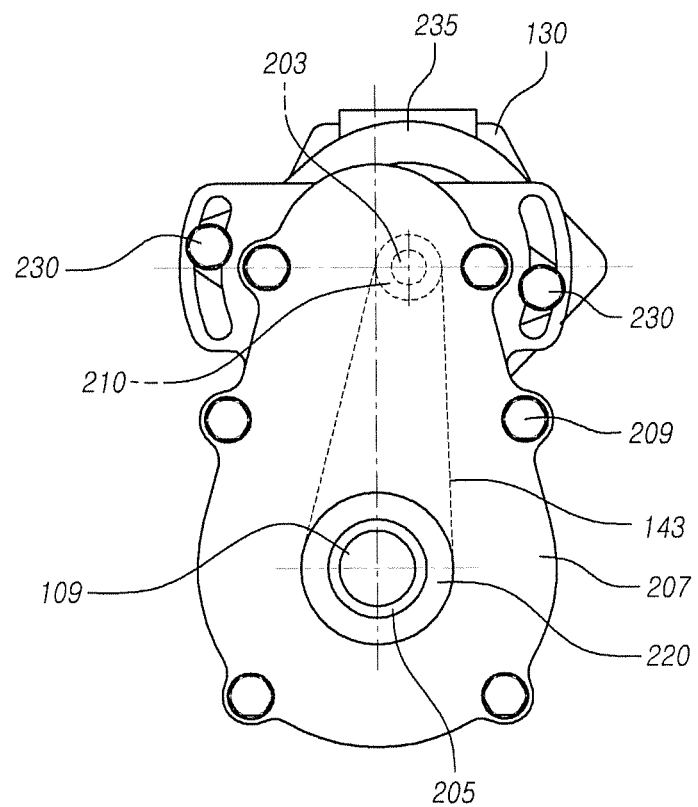
FIG. 2 is a side view illustrating a gear housing and a rack housing according to the prior art.

Hereinafter, some embodiments of the present invention will be described in detail with reference to the accompanying drawings. In adding reference numerals to elements in each drawing, it should be noted that the same elements are designated by the same reference numerals, if possible, although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
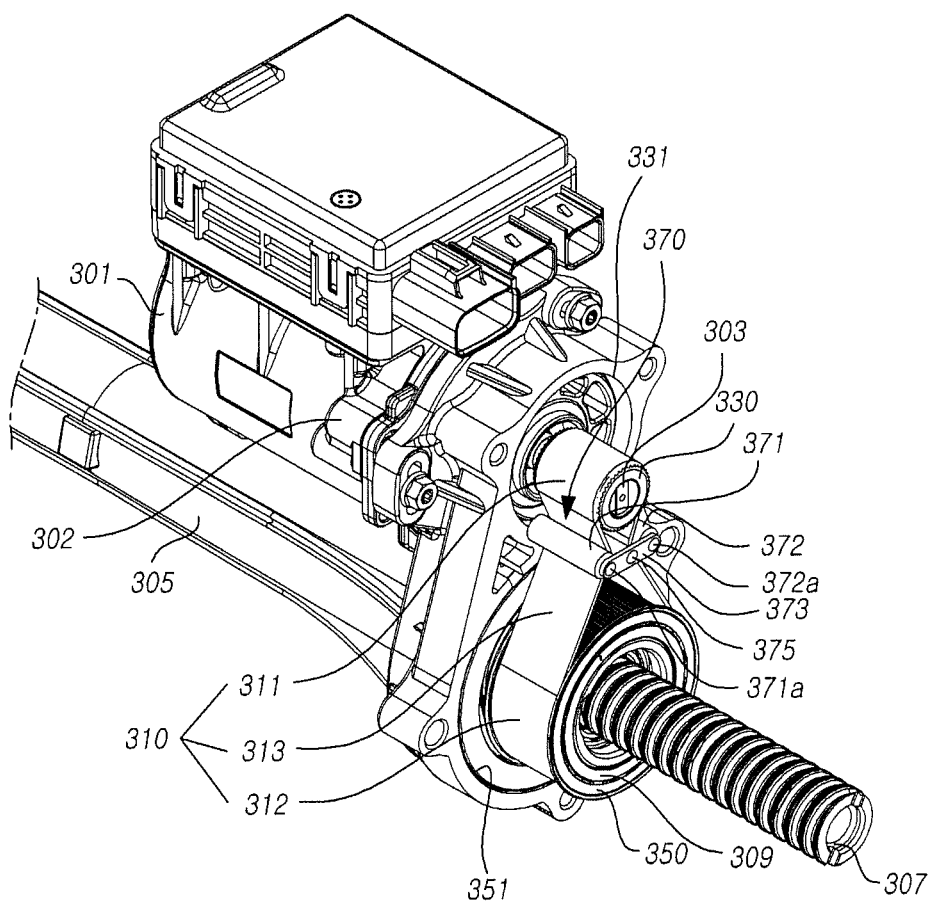
FIG. 3 is a perspective view illustrating a part of an electric power steering apparatus according to an embodiment of the present invention.
Figure 4:
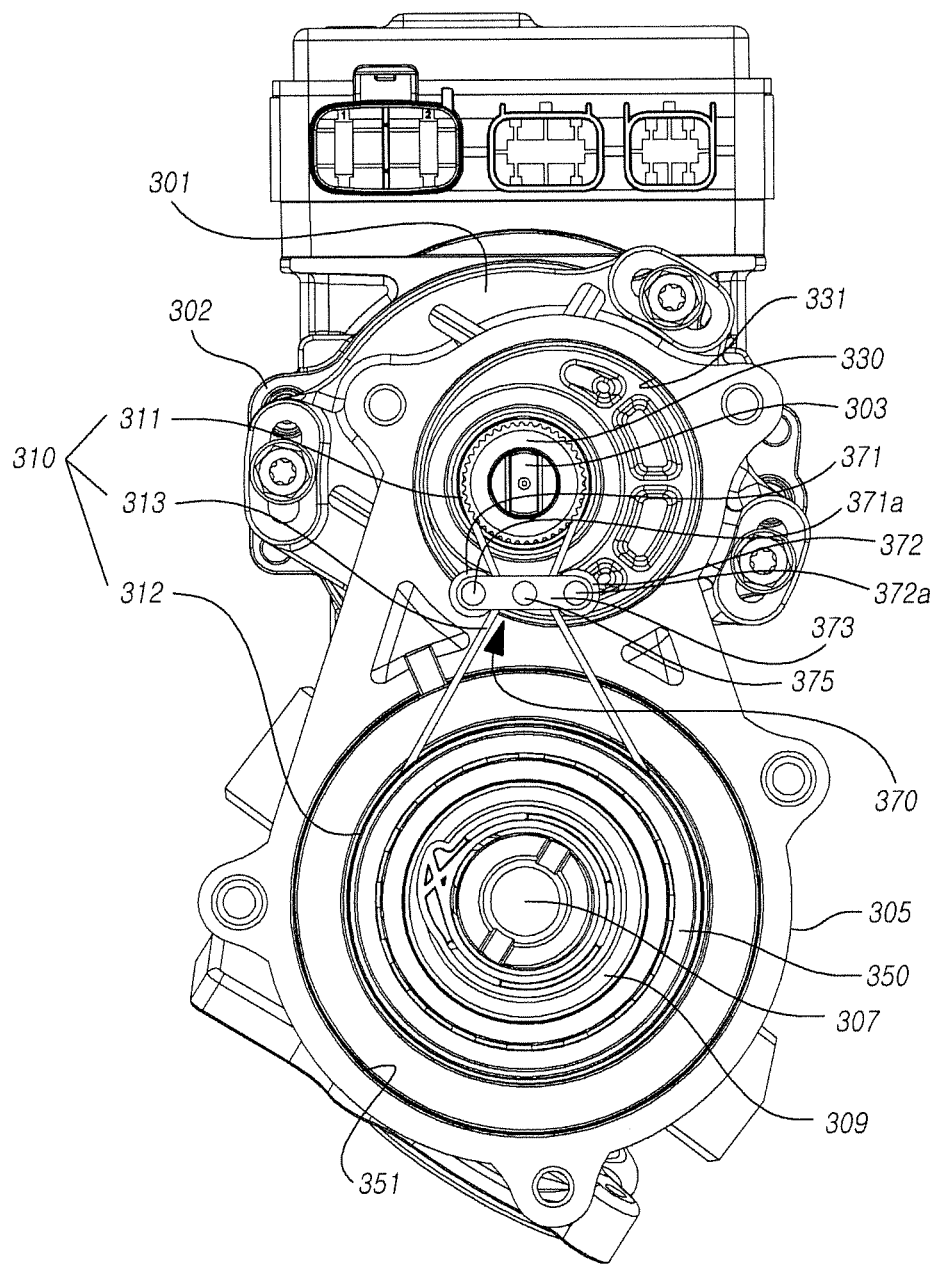
FIG. 4 is a side view of FIG. 3.
Figure 6A:
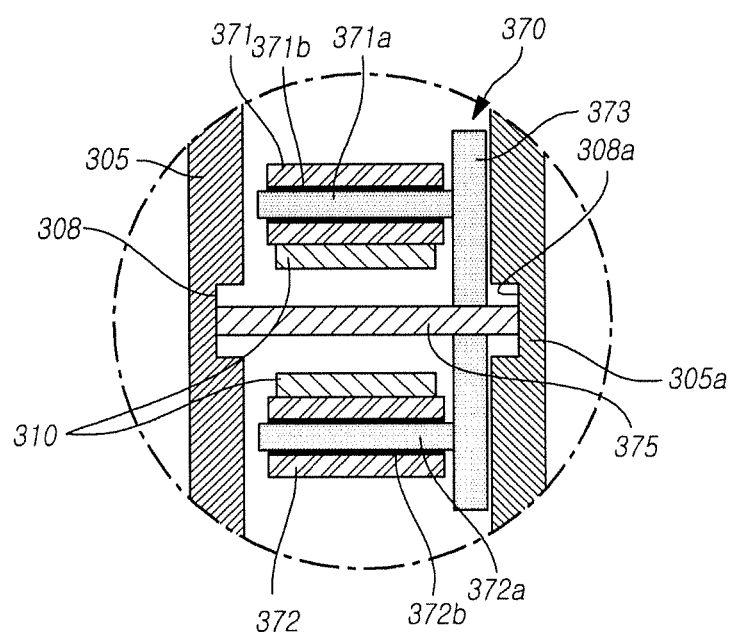
FIGS. 6A and 6B are cross-sectional views each illustrating a modified embodiment of a coupling state of the tension adjusting member in the electric power steering apparatus according to the embodiment of the present invention.
Figure 6B:
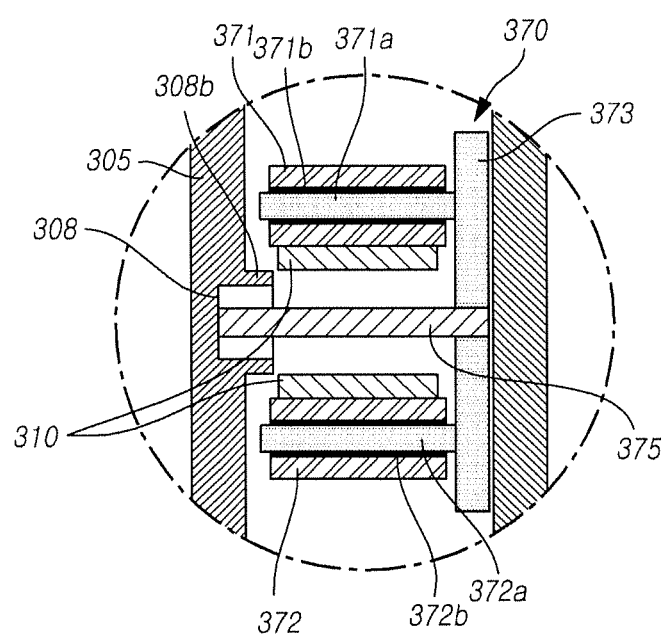
Figure 7A:
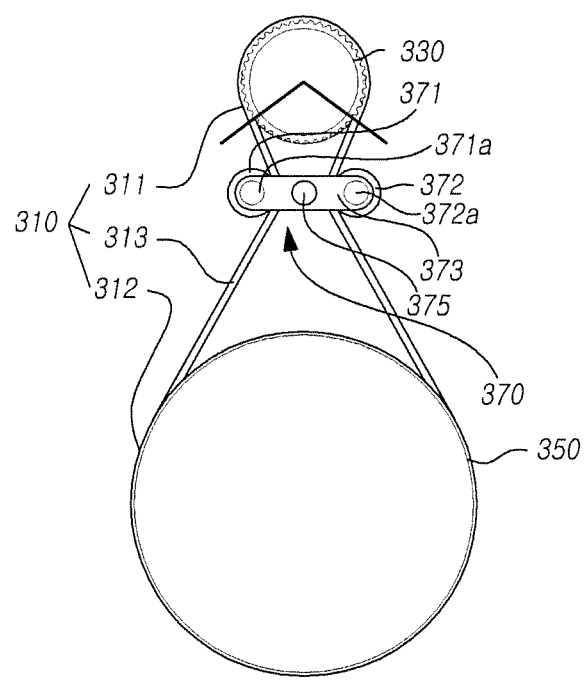
FIGS. 7A to 7C are views each illustrating the operation of the tension adjusting member of the electric power steering apparatus according to the embodiment of the present invention.
Figure 7B:
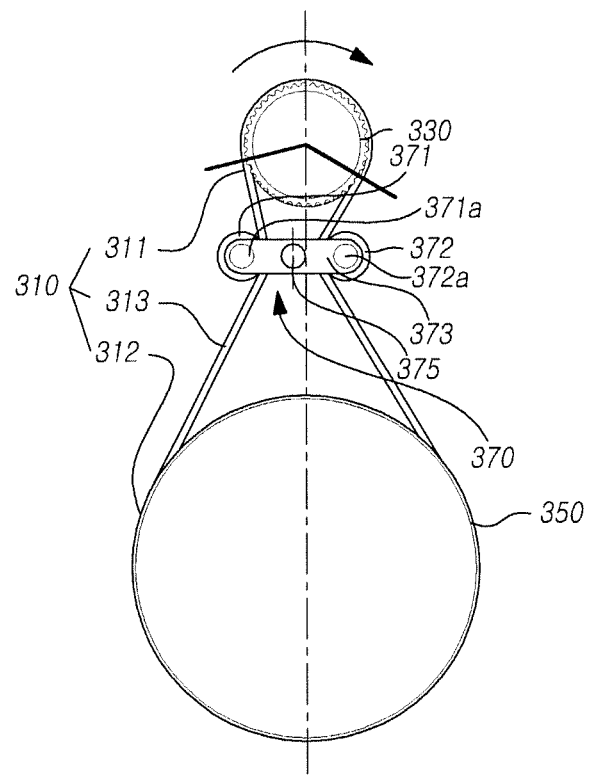
Figure 7C:
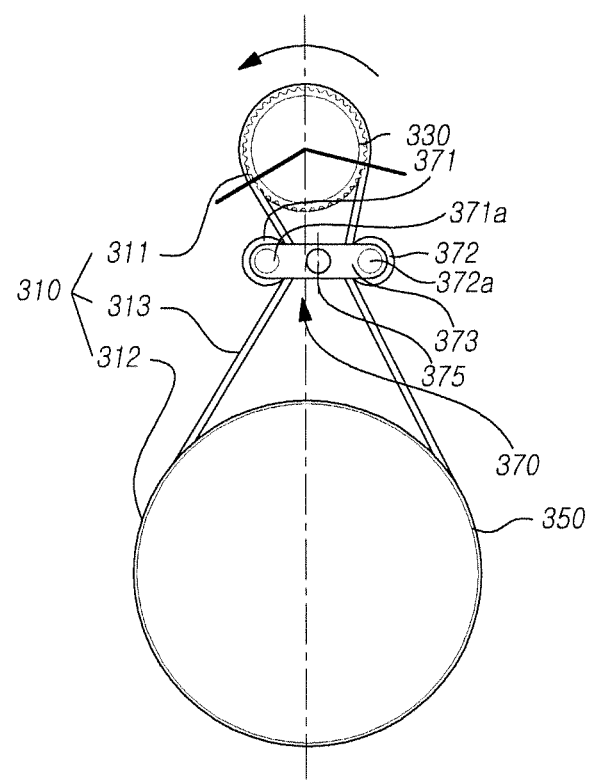
Figure 8:
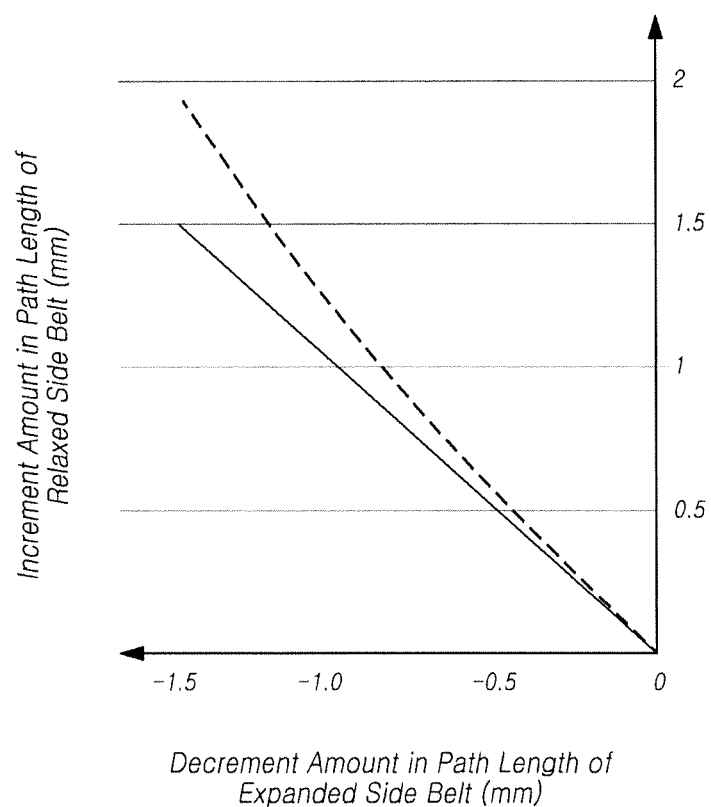
FIG. 8 is a graph illustrating a relationship a decrement amount in the path length of the expanded side belt and an increment amount in the path direction in the relaxed side belt of an electric power steering apparatus.

FIG. 3 is a perspective view illustrating a part of an electric power steering apparatus according to an embodiment of the present invention, FIG. 4 is a side view of FIG. 3, and FIGS. 5A to 5D are schematic views each illustrating a modified embodiment of a sliding recess and a tension adjusting member in the electric power steering apparatus according to the embodiment of the present invention. FIGS. 6A and 6B are cross-sectional views each illustrating a modified embodiment of a coupling state of the tension adjusting member in the electric power steering apparatus according to the embodiment of the present invention, FIGS. 7A to 7C are views each illustrating the operation of the tension adjusting member of the electric power steering apparatus according to the embodiment of the present invention, and FIG. 8 is a graph illustrating a relationship a decrement amount in the path length of the expanded side belt and an increment amount in the path direction in the relaxed side belt of the electric power steering apparatus.

As illustrated in these drawings as well as in FIG. 1, an electric power steering apparatus according to the present invention includes: a rack housing 305 including a sliding recess 308 that is formed between a motor coupling hole 331 in which a motor pulley 330 is mounted and a ball nut coupling hole 351 in which a nut pulley 350 is mounted, the sliding recess 308 being formed to extend in a direction perpendicular to a longitudinal direction where a belt 310 is mounted; and a tension adjusting member 370 that includes a central shaft 375 of which one end is inserted into the sliding recess 308, a connection member 373 coupled to another end of the central shaft 375, a pair of rollers 371 and 372 coupled to opposite ends of the connection member 373 to tighten opposite sides of an outer peripheral face of the belt 310, the central shaft 375 being slid along the sliding recess 308 to adjust the tension of the belt 310.

The electric power steering apparatus includes a driving unit and a driven unit in order to assist a steering force.

The driving unit includes a motor 301 configured to be controlled by an electronic control unit, a motor pulley 330 coupled to a motor shaft 303 to transmit the driving force of the motor 301 to the nut pulley 350 via the belt 310, the belt 310, and so on.

In addition, the belt 310 wound around the motor pulley 330 and the nut pulley 350 to transmit the rotational force of the motor pulley 330 to the nut pulley 350.

In addition, the belt 310 is divided into a first coupling section 311 engaged with the motor pulley 330, a second coupling section 312 engaged with the nut pulley 350, and connection sections 313 interconnecting the first coupling section 311 and the second coupling section 312.

Here, the rollers 371 and 372 to be described later are supported on the connection sections 313 so as to increase the tension of the belt 310.

In addition, the driven unit includes a ball nut 309 configured to support the rack bar 307 within the rack housing 305 that encloses the rack bar 307 and the nut pulley 350 coupled to the outer peripheral face of the ball nut 309.

In addition, a gear housing 305a and a motor housing 302 are coupled to the rack housing 305.

The rack housing 305 is formed with the motor coupling hole 331 in which the motor pulley 330 is mounted and a ball nut coupling hole 351 in which the nut pulley 350 is mounted such that the motor pulley 330, the nut pulley 350, and the belt 310 are provided inside the rack housing 305, and the rack housing 305 is coupled to the gear housing 305a via a fastening member.

The motor pulley 330 connected with the motor 301 and the nut pulley 350 connected with the rack bar 307 are disposed in parallel with each other, and the belt 310 is wound around the motor pulley 330 and the nut pulley 350 to transmit the rotational force of the motor 301 to the rack bar 307 via the ball nut 309, and to move the rack bar 307 from side to side by the operation of the ball nut 309, thereby generating a steering assist power.

The ball nut 309 is coupled with the rack bar 307 via a ball and is rotated, thereby causing the rack bar 307 to be slid in the inside of the rack housing 305 and the gear housing 305a, and the nut pulley 350 is mounted on the outer peripheral face of the ball nut 309 to rotate the ball nut 309 so as to move the rack bar 307 from side to side, thereby generating the steering assist power.

The nut pulley 350 rotating the ball nut 309 as described above is configured to rotate in cooperation with the motor pulley 330 via the belt 310, and after the endurance is aged, the tension of the belt 310 is lowered such that a slip is generated between the motor pulley 330 and the nut pulley 350 and the belt 310, which deteriorates the power transmission performance.

In addition, when assembling the rack housing 305 and the motor 301, the rack housing 305 and the motor 301 are assembled at positions corresponding to set tension values while measuring the tension of the belt 310, but after the endurance is aged, the slip of the belt 310 is generated due to the reduction of the tension, the abrupt operation of the steering wheel 101, the impact that is reversely input from the road surface, or the like.

In particular, when the steering wheel 101 is abruptly operated or an impact reversely input from a road surface is transmitted, a slip may be caused, or a tooth jump phenomenon may be generated to cause the teeth formed on the motor pulley 330, the nut pulley 350, and the belt 310 to be jumped, thereby causing a problem.

Accordingly, the present invention provides the tension adjusting member 370 so as to adjust the tension of the belt 310, in which the tension adjusting member 370 includes the central shaft 375, the connection member 373, and the pair or rollers 371 and 372.

First, one end of the central shaft 375 is inserted into the sliding recess 308 to be slidable, and the other end is coupled to the connection member 373 to be moved with the connection member 373 along the sliding recess 308.

The connection member 373 is provided, at opposite ends thereof, with rotary shafts 371a and 372a of the pair of rollers 371 and 372 (i.e., a first roller 371 and a second roller 372), respectively, and the first roller 371 and the second roller 372 are coupled to the rotary shafts 371a and 372a, respectively.

The rotary shafts 371a and 372a are formed in parallel with the central shaft 375, and are spaced apart from the central shaft 375 by the same interval, and the pair of rollers 371 and 372 are coupled to the rotary shafts 371a and 372a via rotation support members 371b and 372b, respectively.

Here, the rotation support members 371b and 372b may be provided by, for example, needle bearings, and may support the gap between the rotary shafts 371a and 372a and the pair of rollers 371 and 372.

The first roller 371 and the second roller 372 tighten the opposite sides of the outer peripheral face of the belt 310 inwardly so as to expansion the belt 310.

In other words, the first roller 371 and the second roller 372 are engaged with the belt 310 while narrowing the opposite sides of the belt 310 to increase the tension of the belt 310 so that the belt 310 and the motor pulley 330 and the belt 310 and the nut pulley 350 are stably engaged with each other.

In addition, as the engagement area between the belt 310 and the motor pulley 330 and the nut pulley 350 increases, thereby preventing the occurrence of noise and vibration and the damage of the belt 310, which may be caused when the teeth of the belt 310 move over the teeth of the motor pulley 330.

At this time, because the central shaft 375 is slidably inserted into the sliding recess 308, when the motor pulley 330 is rotated in one direction by the driving force of the motor 301 so that any one of the connection sections 313 of the belt 310 is tensioned, the first roller 371 and the central shaft 375 are slid along the sliding recess 308, and hence, the second roller 372 is also slid so that the tensioned remaining one of the connection sections 313 of the belt 310 is further tightened inwardly.

Thus, since the motor pulley 330 is rotated in one direction without the operation of a motor or an operator, the tension adjusting member 370 is slid along the sliding recess 308, thereby adjusting the tension of the belt 310.

In addition, the motor housing 302 is coupled to the rack housing 305 in such a manner in which the motor shaft 303 is eccentrically coupled to the motor coupling hole 331 such that the tension value of the belt 310 can be set in the state where the tension adjusting member 370 is provided to adjust the tension of the belt 310.

In other words, the motor pulley 330 and the motor shaft 303 are mounted to be eccentric to the motor coupling hole 331, and as a result, the tension of the belt 310 can be adjusted by rotating the motor housing 302 coupled to the rack housing 305.

Meanwhile, the central shaft 375 of the tension adjusting member 370 is slid along the sliding recess 308, but the connection member 373 and the rollers 371 and 372 are not rotated with reference to the central shaft 375.

In other words, the tension adjusting member 370 performs only a reciprocal sliding movement with the central shaft 375 that is slid along the sliding recess 308 so as to adjust the tension of the belt 310.

In addition, the tension adjusting member 370 expands one of the connection members 373 of the belt 310 when the motor pulley 330 is rotated by the abrupt rotation or reverse rotation of the motor 301, thereby increasing the tension the tensioned remaining one of the connection members 373, rather than adjusting the tension of the belt 310 by optionally applying a force to the first roller 371 or the second roller 372.

FIGS. 5A to 5D illustrate various embodiments of the tension adjusting member 370 configured to perform only the reciprocal sliding movement while being prevented from rotating, in which the sliding recess 308 and the tension adjusting member 370 are schematically illustrated.

Figure 5A:
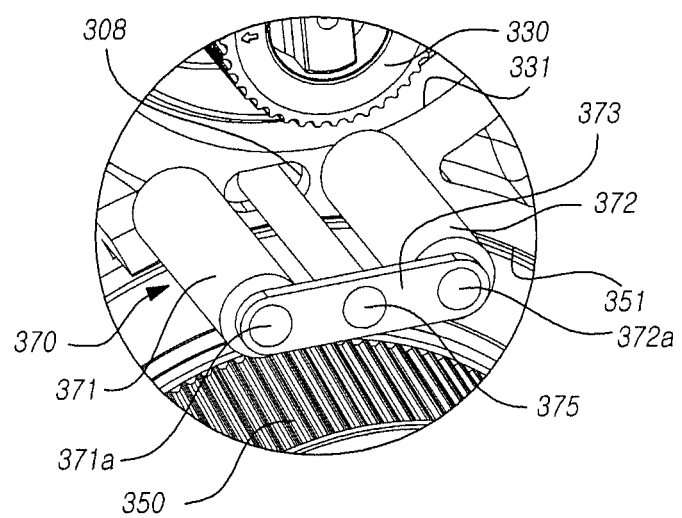
FIGS. 5A to 5D are schematic views each illustrating a modified embodiment of a sliding recess and a tension adjusting member in the electric power steering apparatus according to the embodiment of the present invention.

First, FIG. 5A illustrates the sliding recess 308 formed in the rack housing 305 and the tension adjusting member 370 inserted into the sliding recess 308 to be slid.

Figure 5B:
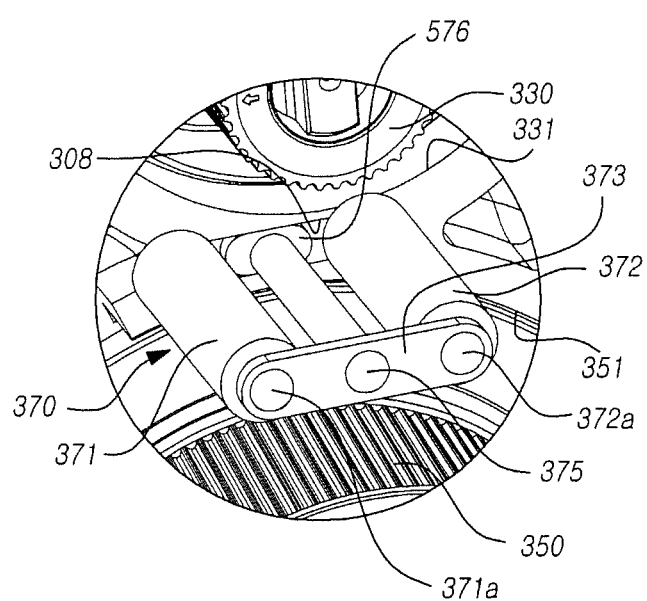

In addition, FIG. 5B illustrates an embodiment in which the sliding recess 308 is formed in the rack housing 305, an end of the central shaft 375, which is opposite to the end coupled to the connection member 373 is coupled to the sliding recess 308, and a guide portion 576 formed to protrude to the opposite sides is provided at the end of the central shaft 375.

The guide portion 576 is supported on the inner circumferential face of the sliding recess 308 to prevent the rotation of the central shaft 375, thereby allowing the tension adjusting member 370 to perform only the reciprocal sliding movement.

Figure 5C:
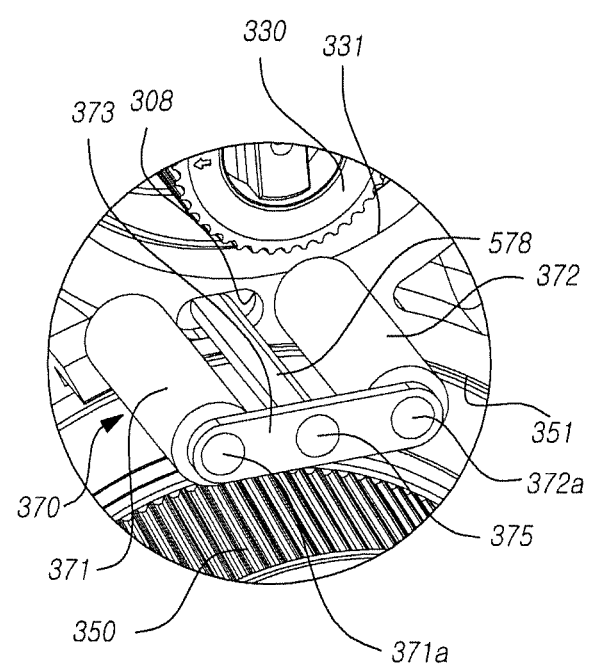

In addition, FIG. 5C illustrates an embodiment in which the sliding recess 308 is formed in the rack housing 305 and a planar shape 578 is formed on the central shaft 375 inserted into the sliding recess 308.

The planar shape 578 is in contact with the inner circumferential face of the sliding recess 308 to prevent the rotation of the central shaft 375, thereby allowing the tension adjusting member 370 to perform only the reciprocal sliding movement.

Figure 5D:
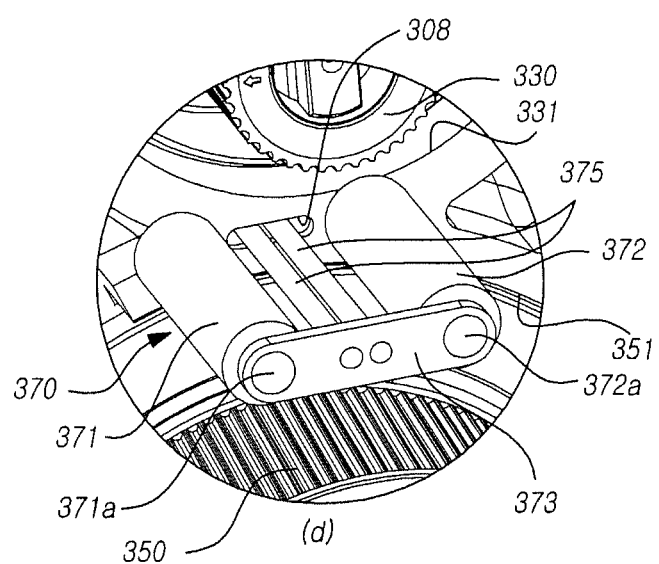

In addition, FIG. 5D illustrates an embodiment in which the sliding recess 308 is formed in the rack housing 305 and two central shafts 375 are provided to be inserted into the sliding recess 308 and to be coupled with the connection member 373. More than two central shafts 375 may be provided as needed.

When a plurality of central shafts 375 are inserted into the sliding recess 308 to prevent the rotation of the tension adjusting member 370.

In addition, FIGS. 6A and 6B illustrate embodiments in which the tension adjusting member 370 is inserted into the rack housing 305 and the gear housing 305a in order to prevent the tension adjusting member 370 from being released from or tilted in the sliding recess 308.

Referring to FIG. 6A, the gear housing 305a is also formed with another sliding recess 308a in a shape corresponding to the sliding recess 308 at a position that faces the sliding recess 308 of the rack housing 305, and the central shaft 375 is formed to extend so that the opposite ends of the central shaft 375 are inserted into the sliding recesses 308 and 308a, respectively.

In other words, the end of the central shaft 375 coupled to the connection member 373 protrudes through the connection member 373, and the opposite ends of the central shaft 375 are inserted into the sliding recesses 308 and 308a to be slid so that the central shaft 375 can be stably slid while being slid along the sliding recesses 308 and 308a.

In addition, referring to FIG. 6B, the rack housing 305 includes a holder portion 308b formed to protrude from the sliding recess 308 toward the gear housing 305a.

The holder portion 308b is formed to protrude toward the gear housing 305a in order to increase the insertion length of the central shaft 375 inserted into the sliding recess 308, and supports the central shaft 375. The holder portion 308b may be formed to protrude toward the rack housing 305 from the sliding recess 308a of the gear housing 305a.

Therefore, the central shaft 375 is inserted into the sliding recess 308 so as to support the holder portion 308b, and may be stably slid without being released from or tilted in the sliding recess 308.

Descriptions will be made in detail on the tension adjustment of the belt 310 by the tension adjusting member 370 with reference to FIGS. 7A to 7C.

FIG. 7A illustrates a state before the motor 301 is driven in which, for example, on the figure, the first roller 371 supports the left side of the belt 310 and the second roller 372 supports the right side of the belt 310.

In addition, as illustrated in FIG. 7B, when the motor 301 is driven so that the motor pulley 330 is rotated clockwise, the left side of the belt 310 on the figure is expanded and the right side of the belt 310 is relaxed. The left side of the belt 310 causes the first roller 371 and the tension adjusting member 370 to be slid leftward, and at the same time, the second roller 372 is also slid leftward, thereby causing the right side of the belt 310 to be expanded.

Thus, the right side of the belt 310 is highly tensioned by being pulled leftward as the tension adjusting member 370 is slid leftward.

At this time, since the decrement amount of the path length of the expanded side belt 310, which is the left side of the belt 310, is smaller than the increment amount of the path length of the relaxed side belt 310, which is the right side of the belt 310, the path length of the entire belt 310 increases. While the length of the belt 310 itself is limited, the path length of the entire belt 310 increases, and as a result, the tension of the belt 310 increases.

Here, the path length of the belt 310 refers to a length in the state where the belt 310 is wound around and engaged with the motor pulley 330, the nut pulley 350 and the pair of rollers 371 and 372. In the case where the path length of the belt 310 is longer than the length of the belt 310 before the belt 310 is engaged, the belt 310 is engaged in the expanded state.

On the contrary, in the case where the path length of the belt 310 is shorter than the length of the belt 310 before the belt 310 is engaged, the belt 310 is engaged in the tensioned state.

In addition, in contrast to this, FIG. 7C illustrates a state in which the motor pulley 330 is rotated counterclockwise so that the tension adjusting member 370 is slid rightward.

In connection with this, FIG. 8 illustrates a graph, from which a relationship between a decrement amount in path length of the expanded side belt 310 and an increment amount in path length of the relaxed side belt 310 can be seen.

As can also be seen from the graph, the decrement amount in path length of the expanded side belt 310 is smaller than the increment amount in path length of the relaxed side belt 310, and as the decrement amount in path length of the expanded side belt 310 increases, the increment amount in path length of the relaxed side belt 310 further increases.

That is, the difference between the decrement amount in path length of the expanded side belt 310 and the increment amount in path length of the relaxed side belt 310 increases as the expanded side belt 310 is expanded, and the tension of the belt 310 increases as the expanded side belt 310 is expanded.

Accordingly, as the expanded side belt 310 is expanded, the central shaft 375 is slid to the opposite ends of the sliding recess 308, and as the central shaft 375 is slid to the opposite ends of the sliding recess 308, the tension of the belt 310 gradually increases due to the tension adjusting member 370.

According to the embodiments of the present invention that have the above-described shapes and structures, when the driver causes the steering wheel to collide with left and right lock ends at a rapid speed, or when strong impact is transmitted, which is reversely input from a road surface, the tension of a belt is increased to prevent the occurrence of a tooth jump phenomenon that causes teeth formed on the motor pulley, the nut pulley, and the belt to be jumped is generated, thereby improving the driving stability of the vehicle, and at the same time, providing a comfortable steering feeling to the driver by preventing the occurrence of vibration and noise.

In addition, the tension adjusting member is slid without the operation of a motor or an operator to increase the engagement areas between the motor pulley and the nut pulley and the belt. Thus, the noise and vibration, and the damage of the belt, which are caused as the teeth of the belt move over the teeth of the motor pulley, can be prevented, and the path length of the belt can be increased to increase the tension thereof.

Even if it was described above that all of the components of an embodiment of the present invention are coupled as a single unit or coupled to be operated as a single unit, the present invention is not necessarily limited to such an embodiment. That is, at least two elements of all structural elements may be selectively joined and operate without departing from the scope of the present invention.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An electric power steering apparatus comprising:
   a rack housing including a sliding recess that is formed between a motor coupling hole in which a motor pulley is mounted and a ball nut coupling hole in which a nut pulley is mounted, the sliding recess being formed to extend in a direction perpendicular to a longitudinal direction where a belt is mounted; and
   a tension adjusting member including a central shaft one end of which is inserted into the sliding recess, a connection member coupled to another end of the central shaft, a pair of rollers coupled to opposite ends of the connection member to tighten opposite sides of an outer peripheral face of the belt, the central shaft being slid along the sliding recess to adjust the tension of the belt.

2. The electric power steering apparatus of claim 1, wherein the central shaft is provided with a planar shape on a peripheral face thereof to prevent the tension adjusting member from being rotated.

3. The electric power steering apparatus of claim 1, wherein the central shaft is provided with a guide portion that is formed to protrude to opposite sides at an end that is opposite to an end to which the connection member is coupled to prevent the tension adjusting member from being rotated.

4. The electric power steering apparatus of claim 1, wherein the tension adjusting member is provided with a plurality of central shafts to prevent the tension adjusting member from being rotated.

5. The electric power steering apparatus of claim 1, wherein another sliding recess is formed on a gear housing coupled to the rack housing at a position corresponding to the sliding recess, and the end of the central shaft to which the connection member is coupled protrudes through the connection member, and opposite ends of the central shaft are inserted into the sliding recesses to be slid.

6. The electric power steering apparatus of claim 1, wherein the tension of the belt is increased as the central shaft is slid to opposite ends of the sliding recess.

7. The electric power steering apparatus of claim 1, wherein rotary shafts are provided at the opposite ends of the connection member such that the pair of rollers are coupled to the connection member, and the pair of rollers are coupled to the rotary shafts via rotation support members.

8. The electric power steering apparatus of claim 1, wherein a holder portion is formed on the rack housing to protrude from the sliding recess toward the gear housing such that an insertion length of the central shaft inserted into the sliding recess is increased by the holder portion.

* * * * *